US004001625B2

United States Statutory Invention Registration [19]

[11] Reg. Number: H1625

Frankel

[45] Published: Jan. 7, 1997

[54] DISTORTION-COMPENSATED FIBER-OPTIC MULTI-TAP PROPORTIONAL TRUE TIME DELAY

[75] Inventor: Michael Y. Frankel, Crofton, Md.

[73] Assignee: United States of America, Washington, D.C.

[21] Appl. No.: 528,083

[22] Filed: Sep. 14, 1995

[51] Int. Cl.[6] ..... H01Q 3/22

[52] U.S. Cl. ..... 342/375

*Primary Examiner*—Bernarr E. Gregory

*Attorney, Agent, or Firm*—Thomas E. McDonnell; Charles J. Stockstill

[57] ABSTRACT

In the distortion-compensated fiber-optic multi-tap proportional true time-delay for an array antenna a modulated optical signal having at least one wavelength and predetermined optical spectrum and containing at least one modulated signal is propagated along a high-dispersion optical fiber having a plurality of branch optical fibers of zero-dispersion. The varying lengths of the branch optical fibers provide varying time delays for the respective modulated optical signals applied as an electrical signal to an associated antenna element forming the array antenna. To eliminate an inherent distortion of the modulated optical signal in the high-dispersion optical fiber a phase conjugator at one or more equidistant points along the high-dispersion optical fiber inverts the optical spectrum of the modulated optical signal about a predetermined inversion frequency.

4 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DISTORTION-COMPENSATED FIBER-OPTIC MULTI-TAP PROPORTIONAL TRUE TIME DELAY

BACKGROUND OF THE INVENTION

1. Field of the Invention

This invention generally relates to an array antenna system for directing and receiving electromagnetic energy and more particularly to a fiber optic true time-delay array antenna feed system.

2. Description of the Related Art

An antenna array is a stationary group of individual radiating and collecting elements that collectively form electronically steerable transmit and receive beams. The electromagnetic radiation signal driving and received by each element is identical to or from each other element except for the relative time delays present. To achieve a desired steering of the electromagnetic beam a technique must be included in the architecture of the system that provides a variable time delay scheme to allow the electromagnetic signal to be processed by the different antenna elements at varying times. In some systems this is achieved by routing numerous conventional coaxial or waveguide transmission lines of varying lengths, however this system is unwieldy, heavy, expensive and lossy.

Other techniques, such as the use of optical fiber transmission lines, have been used. To achieve the time delay required in the array antenna systems the technique of electromechanical optical fiber stretching has been proposed. See, U.S. Pat. No. 4,814,774, Herczfeld (1989). Here time delays are introduced into the signal delivered by each antenna element by stretching the fiber-optic link feeding each element. However, to produce significant time delays (~1 ns), long fiber lengths are required, thereby resulting in large stretching forces.

Various different switching schemes involving switching in and out or selecting various different discrete fiber-optic delays have been proposed. A wavelength dependent, tunable, optical delay system based on selectively varying the wavelength of optical light is described in U.S. Pat. No. 4,671,604, Soref. Utilizing plurality of wavelength filter combinations or cleaved-coupled-cavity ($C^3$) lasers, the time-delay of the signal exiting the fiber can be varied over a preselected range by selectively varying the wavelength of the optical carrier signal. However, to effectively and accurately delay the optical signal, the output of all lasers and the wavelength of all tunable filters must be changed equally and simultaneously. The device in Soref is, thus, complicated to operate and has many expensive components. Further, Soref specifies direct radio frequency (RF) modulation of the optical source, which results in an interaction between the RF signal and the optical carrier signal.

SUMMARY OF THE INVENTION

The object of this invention is to provide a device for dynamically generating a plurality of identical signals with correlated, continuously variable, relative true time-delays for array antennas operating in the radio-frequency, microwave and millimeter wavebands.

This and other objectives are achieved by utilizing a high-dispersion fiber transmitting a modulated optical light beam and a plurality of zero-dispersion optical fibers of varying lengths branching from the high-dispersion fiber at pre-determined intervals conducting a portion of the modulated optical light beam, thereby producing a variable true time-delay in the optical signal to associated antenna elements of an array antenna system. To compensate for an induced distortion of the original modulated optical signal in the high-dispersion optical fiber, one or more phase conjugators are inserted at one or more predetermined points along the high-dispersion optical fiber to invert the optical spectrum of the modulated optical laser light beam about a predetermined inversion frequency.

BRIEF DESCRIPTION OF THE DRAWINGS

FIG. 1(*b*) shows a multi-tap dispersive true time-delay link having a plurality of phase conjugators.

DESCRIPTION OF THE PREFERRED EMBODIMENTS

As the optical signal passes through the high-dispersion optical fiber the upper and lower modulated sidebands propagate at different velocities and accumulate a phase difference, or phase walk-off. To correct this phase walk-offdistortion, or to "unwrap" the signal, a phase conjugator 28 is placed at the midpoint of line segments of equal length. If one phase conjugator 28 is utilized, as in FIG. 1, it is nominally placed at the midpoint of the dispersive fiber. If two phase conjugators 28 are utilized, the phase conjugators 28 are nominally placed at the quarter point, and so on. The important consideration being that the length of fiber preceding the phase conjugator 28 must have a nominally equal length of fiber following the phase conjugator 28. The phase conjugator 28, as shown in FIG. 2, is an element that creates as its output a replica of an input optical signal with every frequency component having a conjugate phase. After propagating through a section of highly-dispersive fiber 22 each frequency component experiences a substantially different phase shift. After phase conjugation, the optical signal then propagates through another similar section of highly-dispersive fiber 22 and the effects of the dispersion on the phase are effectively undone and an original undispersed optical signal is restored.

Figure 1A:
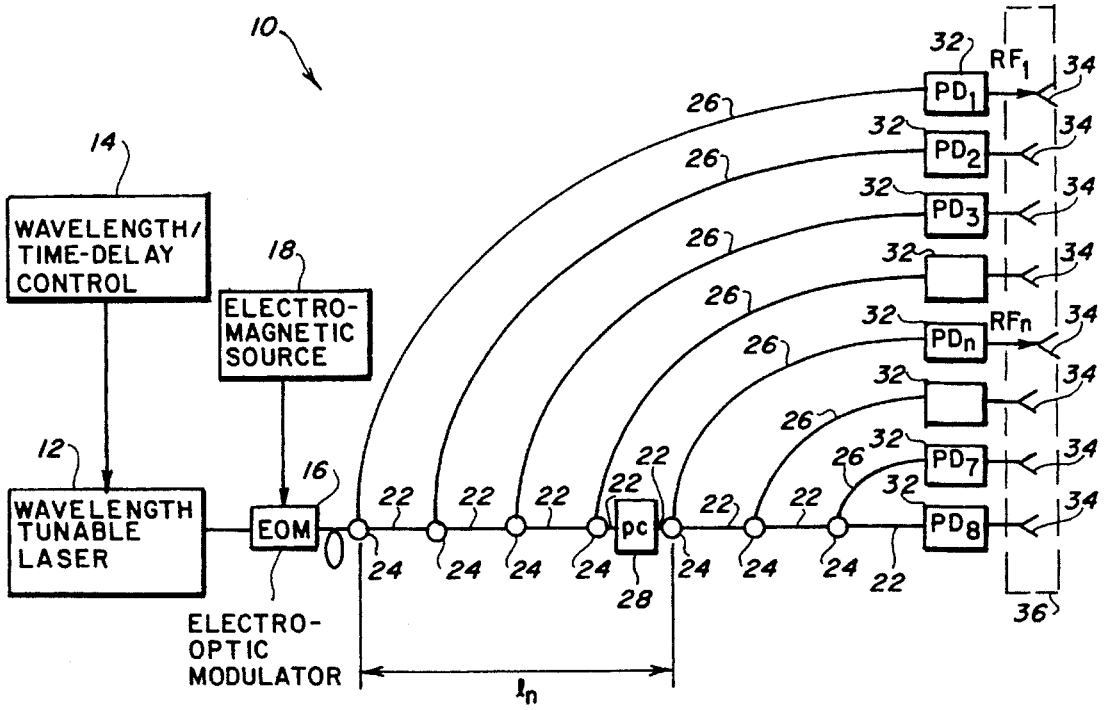
FIG. 1(*a*) shows a multi-tap dispersive true time-delay link having one phase conjugator.
Figure 1B:
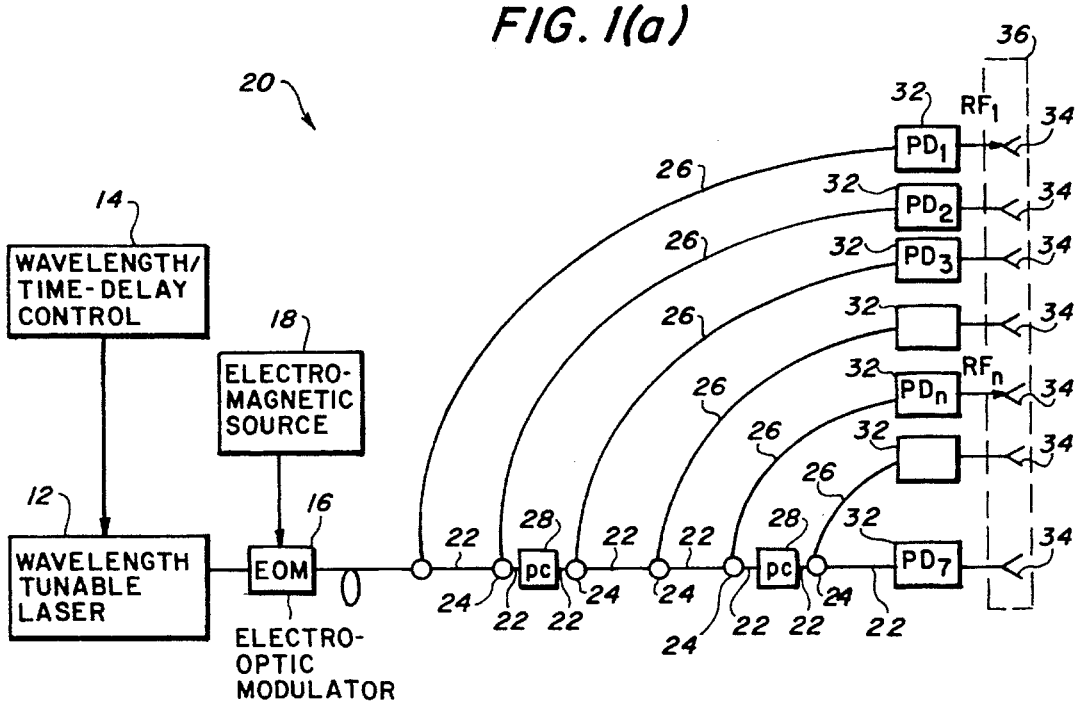
Figure 2:
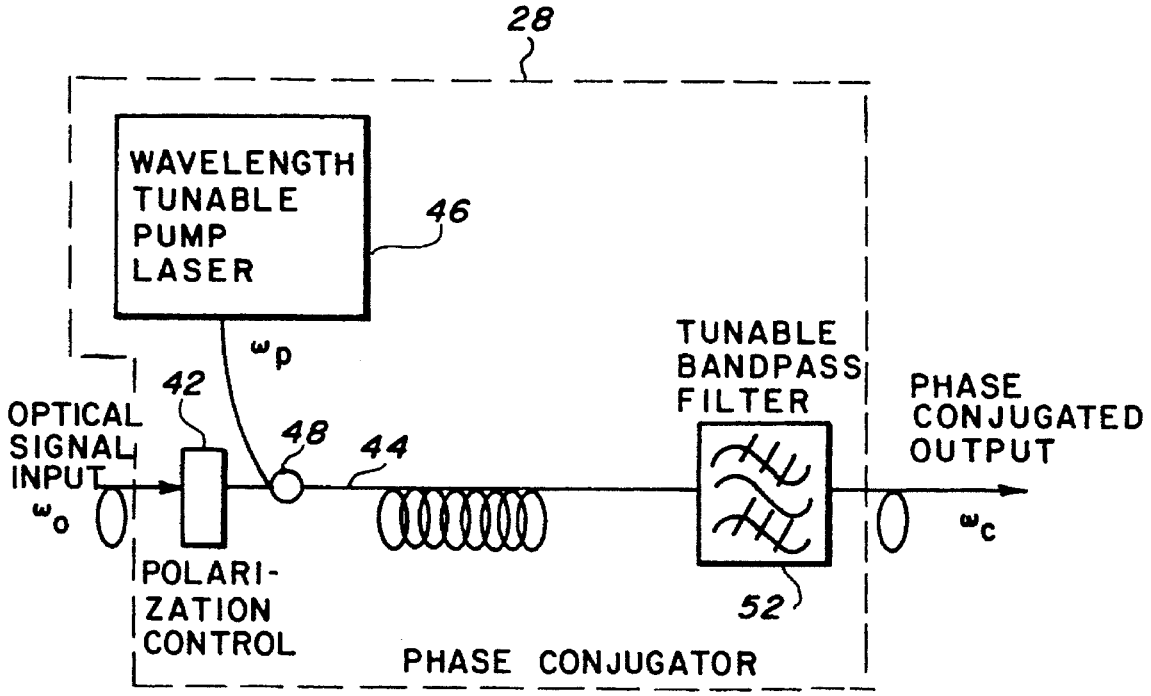
FIG. 2 shows a typical fiber-optic phase conjugator.

In the preferred embodiment, FIG. 1, the distortion-compensated fiber-optic multi-tap proportional true time-delay 10 is comprised of eleven major components; a signal laser capable of producing a tunable narrow-linewidth optical carrier signal 12, a wavelength/time-delay controller 14, an electro-optic modulator 16, an electromagnetic source 18, a high-dispersion optical fiber 22, one or more optical splitter/combiners 24, a plurality of zero-dispersion optical fibers 26, one or more phase conjugators 28, a plurality of photodetectors 32, and a plurality of antenna elements 34 forming an array antenna 36.

The laser 12 is a continuously tunable laser with a single wavelength output. The laser 12 may be of any type—semiconductor, fiber, gas, etc.—capable of generating an optical carrier with a spectral width that is narrow when compared to the laser tuning range, i.e., the ratio of the spectral width to tuning range is preferably less than 0.01. Control of the signal laser 12 is accomplished though a wavelength/time-delay controller 14. The wavelength/time-delay controller 14 controls the wavelength of the optical carrier produced by the signal laser 12 and thereby sets and varies the propagation delay of an optical signal emanating from an electro-optical modulator (EOM) 16. Dependent upon the type of laser 12 utilized, the wavelength/time-delay controller 14 may be a constant voltage power supply, an electrical signal generator, a conventional digital-to-analog converter where the voltage output corresponds to a digital input such as an arbitrary waveform generated by conventional computer circuits, or any similar voltage source.

The electro-optical modulator 16 modulates the optical light generated by the signal laser 12 with the electrical signal 18 from an electromagnetic source 18 that is to be variably delayed. The interaction of the signal laser 12 optical light and the electrical signal in the EOM produces a modulated optical output, or an original optical signal, $\omega_o$. The EOM 16 may be of any format (modulation of the optical frequency, phase, etc.).

The original optical signal is applied to a length of optical fiber 22 where it propagates at a velocity dependent on the optical wavelength of the original optical signal and the effective index of refraction of the fiber 22 at that wavelength. The optical fiber preferably is a highly dispersive fiber (absolute value more than 65 ps/km-nm) in the 1525–1585 nm low-attenuation wavelength window. Utilization of the dispersive optical fiber reduces the overall fiber length and associated overall delay needed to obtain a desired range of relative or differential delay.

Along the length of the high-dispersive optical fiber 22 a plurality of optical splitter/combiners 24 are located at predetermined points that split the original signal, $\omega_o$, into branch links of zero-dispersive optical fibers 26 feeding individual photodetectors 32 associated with a particular antenna element 34 of the array antenna 36. Each optical fiber 22 and 26 produces a different propagation time for the resident optical light thereby producing a time-delay that differs from fiber to fiber, thereby allowing the propagation wavefront of the electromagnetic beam from the array antenna 36 to be selectively controlled.

The photodetector 32 converts the variably delayed modulated optical signal from optical intensity to an electrical signal output. The photodetector 32 may be an optical intensity sensitive photodetector or an optically coherent photodetection means for converting frequency or phase modulated signals into electrical signals.

To compensate for an induced distortion of the original optical signal in the high-dispersion optical fiber, this invention inserts one or more phase conjugators into the high-dispersion optical fiber link 22. The phase conjugator 28, the construction of which is well known to those skilled in the art, is comprised of a polarization control 42, a length of zero-dispersion optical fiber 44, a wavelength tunable pump laser 46, an optical combiner 48, and a tunable bandpass filter 52. The pump laser 46, preferably is the same type laser as the original wavelength tunable laser 12. The controlling parameter in the selection of the pumped laser 46 is the properties of the medium, the optical fiber material, where the phase conjugation takes place. Typically the optical fiber 44 is made out of silica glass which is typically non-linear and not very efficient, therefore long lengths of optical fiber are required in the phase conjugator 28 design.

The modulated optical signal, $\omega_0$, is applied to the phase conjugator 28 through the polarization control 42 and mixed with an optical signal from the wavelength tunable pump laser 46, $\omega_p$, in the optical combiner 48. The frequency of the optical signal, $\omega_p$, from the pumped laser 46 is offset from the original optical signal, $\omega_o$, by an frequency difference, $\Delta\omega$, a difference that is proportional to the reciprocal of the dispersion times the length of the optical fiber 44. The mixed optical signal is filtered by the tunable bandpass filter 52 to remove the original optical signal, $\omega_o$, and the optical signal from the pumped laser 46, $\omega_p$, and outputs the mirrored optical signal, $\omega_c$.

Figure 3:
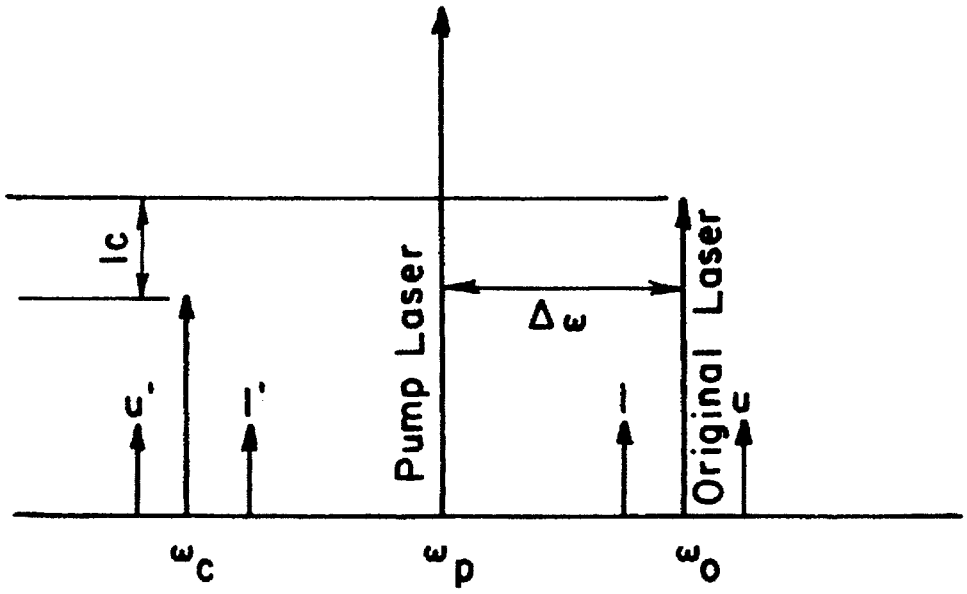
FIG. 3 shows a graphical illustration of the spectral inversion property of phase conjugation.

Considering an optical signal with a frequency $\omega_o=\omega_p+\Delta\omega$, which is near the pump laser frequency of $\omega_p$, as shown in FIG. 3. Then the output wave frequency is $\omega_c=2\cdot\omega_p-\omega_o=2\cdot\omega_p-\omega_p-\Delta\omega=\omega_p-\Delta\omega$. So in effect, as shown in FIG. 3, the upper (u) and lower (l) modulation sidebands of the original optical signal, $\omega_o$, are reversed, or inverted, to produce a mirrored optical signal, $\omega_c$, i.e., the upper sideband (u) now becomes the lower sideband (l') and the lower sideband (l) becomes the upper sideband (u'), and the signal suffers a conversion loss, $L_c$; then as the signal passes through the equal length of high-dispersive optical fiber following the phase conjugator 28, the different velocities of propagation of the mirrored upper (u') and lower (l') sidebands produces a signal comparative to that entering the high dispersive optical fiber link. The conversion efficiency of phase conjugator 28 is linearly related to the pump laser 46 power and inversely related to the fiber length, or the interaction length, $l_n$. The optimal power for the pump laser 46 is the maximum attainable, the more power the laser is capable of producing, the shorter the length of optical fiber required in the phase conjugator 28.

Figure 4:
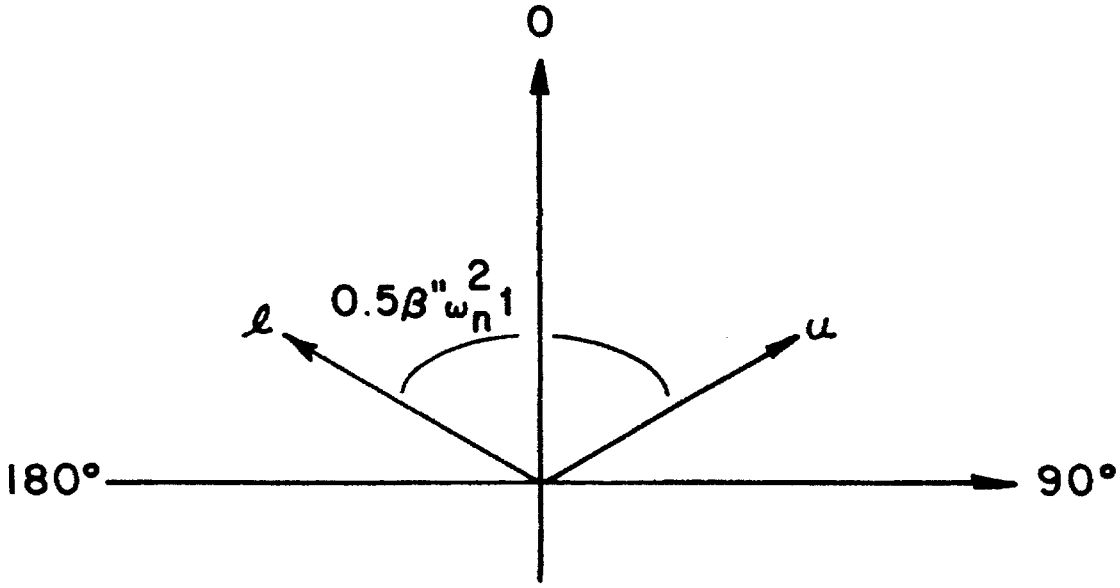
FIG. 4 shows the two components at the modulation frequency produced by the photodetector with the phase walk-off due to optical dispersion.

The inversion in the phase conjugator 28 affects the amplitude-modulated (AM) optical carrier propagation along the optical fiber in the following manner. Considering that the propagation of an AM-modulated optical carrier through a fiber link in which the propagation constant, $\beta$, including dispersive effects, can be expanded near the carrier frequency $\omega_o$ as $$\beta(u)=\beta_o+\beta'(u-\omega_o)+\tfrac{1}{2}\beta''(u-\omega_o),$$

where $\beta(u)$ is the propogation constant, $\beta_o$, $\beta'$ and $\beta''$ are the first and second derivatives respectively, and u is the optical signal frequency. The AM modulation adds an upper and lower sideband onto the optical carrier, which are offset by the modulation frequency. The group velocity is different for the carrier and the sidebands due to dispersion. The photodetector 32 mixes the carrier with each of the individual sidebands to produce two electrical signals at the modulation frequency $\omega_{rf}$. The phase relationship between these two signals is altered by the dispersion so that they no longer add perfectly in phase. This phase walk-off of the two $\omega_{rf}$ signals in phasor form is shown in FIG. 4. Mathematically, when the dispersed and delayed optical signal is incident on the photodetector, the output current, I(t,l), is given as:

$$\begin{aligned} I(t,l) &= \Psi_o(t,l)\cdot\Psi_o^*(t,l) \qquad \text{II} \\ &= \eta\cos(1/2\,\beta''\omega_{rf}^2 l)\cdot\cos(\omega_{rf}t-\beta'\omega_{rf}l). \end{aligned}$$

It is to be noted that the second cos() term is exactly the microwave signal that is being delayed. Also, the phase of this microwave signal, given by $\beta'\omega_{rf}l$ is linear with $\omega_{rf}$ indicating true time-delay operation. Further, the leading cos() term indicates that the microwave signal is not of constant amplitude, but rather suffers distortion periodically along the fiber path. It is this distortion that limits the bandwidth of real optical carrier signals and the true time-delay capability of the dispersive delay lines.

When the optical signal is injected into the phase conjugator 28, the upper and lower sidebands undergo spectral inversion around the carrier signal. After propagating through another length, l, of high dispersion fiber, the signal detected by the photodiode will be $$I_c(t,l)=\Psi_c^*(t,l)\cdot\Psi_c^*(t,l)=\eta\cdot\cos(\omega_{rf}t-\beta'\omega_{rf}2l)$$

As can be seen the true time-delay function is preserved, with a factor of two in the phase indicating that the signal has propagated through an overall length of 2.1 of high dispersion fiber. However, the dispersion-induced distortion has been completely removed.

In the design and construction of the phase conjugator 28, the conjugate wave should be separate from the pump and input waves at the output. A tunable narrow-band band-pass filter 52 at the output may be used for this purpose. For example, the use of a filter with a bandwidth of 0.4 nm (50 GHz) will require that the pump laser 46 and the signal laser 12 wavelengths be separated by at least that amount. Also the phase conjugated wave will differ in wavelength from the input wavelength by twice the separation from the pump. Therefore, the pump laser 46 functions as a spectral mirror and the amount of dispersive fiber required for complete signal recovery may be slightly different.

The coupling efficiency between the pump and the original optical input waves depends on the matched polarizations. A linearly polarized optical pump laser 46 is readily obtained, for instance from fiber-optic lasers, but the optical input wave is generally of unpredictable polarization. A solution to this would be the use of electro-optic polarization linearizers.

The conjugate wave generation is proportional to the interaction length, l, pump power $P_{pump}$, and the square of material nonlinear susceptibility $\Psi^{(3)}$. For standard silica glass optical fiber, the susceptibility $\Psi^3$ is ~$6.10^{-23}$ $m^2/V^2$. Therefore, ~20 km of single-mode fiber will be necessary for efficient conjugation at reasonable (~20 mW) pump powers. With a more exotic chalcogenide glass ($Ag_2S_3$) a susceptibility, $\Psi^{(3)}$, of ~$5.10^{-21}$ $m^2/V^2$ can be obtained and only ~2 m of fiber will be necessary for a similar conversion efficiency.

Figure 5:
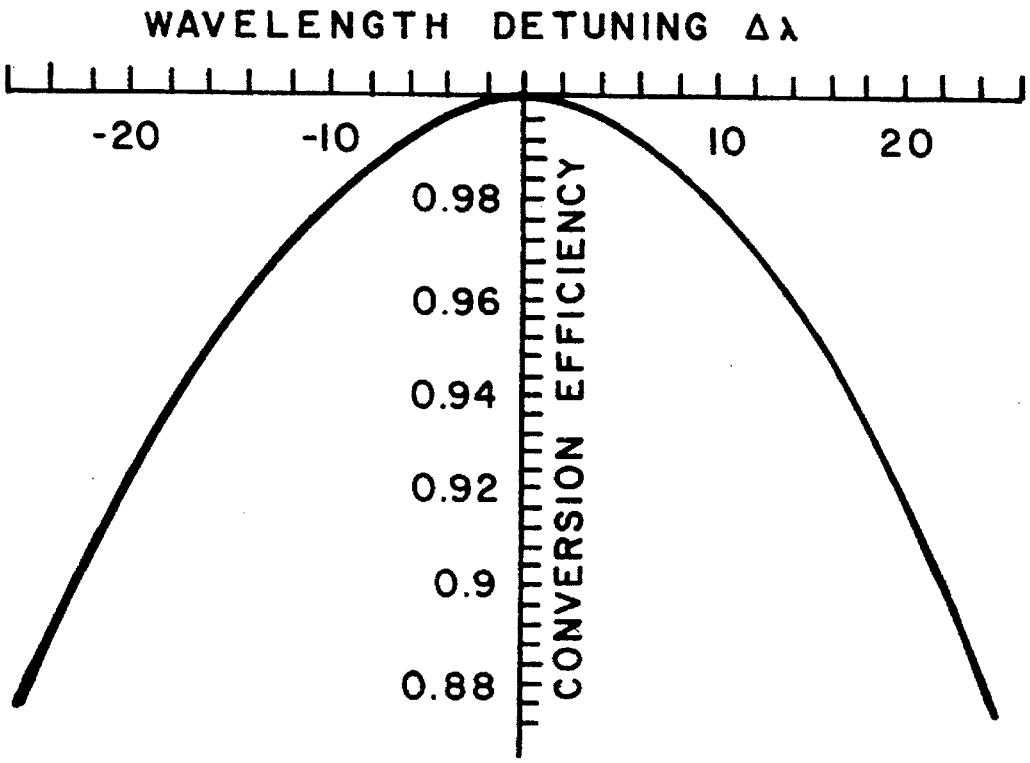
FIG. 5 shows the typical phase conjugator conversion efficiency due to phase walk-off in a 10 km low-dispersion silica fiber link for ±25 nm pump-signal wavelength difference.

The optimal conversion efficiency depends on an ideal phase match between the pump, input, and conjugate optical waves. If the conjugate fiber is dispersive, then the efficiency is degraded, therefore, if the desired wave separation of 0.4 nm is achieved, the phase mismatch can be substantial. The problem is further exacerbated by the fact that the wavelength will be variable, depending on the chosen microwave delay, however, this can be overcome by the fabrication of a silica fiber with broadband low dispersion characteristics. For example, if a silica fiber with zero dispersion at $\lambda_0$=1550 nm is assumed, a reasonable dispersion slope of 0.01 ps/km.nm$^2$, a length of 10 km, an attenuation of 0.3 dB/km, and wave separation of 0.8 nm (100 GHz), then the conversion efficiency will vary as shown in FIG. 5 as a function of the wavelength detuning $\Delta\lambda$ from $\lambda_0$.

This specification sets forth the preferred embodiments of the fiber optic true time-delay antenna feed and applications thereof. Other individuals skilled in the art may visualize many other applications for utilizing the invention, but the scope of the invention is as set forth in the claims.

What is claimed is:

1. A fiber-optic true time-delay array antenna feed system comprising:

means for generating at least one modulated optical signal having at least one wavelength and predetermined optical spectrum and containing at least one modulated signal;

means for, in a transmit mode, splitting the modulated optical signal into a plurality of modulated optical signals and, in the receive mode, combining a plurality of modulated optical signals into at least one optical signal;

means for respectively propagating the plurality of modulated optical signals at a velocity dependent on the optical wavelength of each of the modulated optical signals thereby producing a plurality of time delayed modulated optical signals;

means for inverting the optical spectrum of the modulated optical signal about a predetermined inversion frequency at predetermined locations along at least one of the propagating means;

means for respectively converting, in a transmit mode, the plurality of time -delayed modulated optical signals into a plurality of electromagnetic signals and, in the receive mode, converting a plurality of electromagnetic signals into a plurality of optical signals; and means for transmitting and receiving the plurality of electromagnetic signals.

2. A fiber-optic true time-delay array antenna feed system, as in claim 1, wherein the means for inverting the optical spectrum of the modulated optical signal about a predetermined inversion frequency is a phase conjugator.

3. A fiber-optic true time-delay array antenna feed system comprising:

a wavelength tunable laser generator for generating an optical laser light beam having an optical spectrum;

a wavelength controller for controlling the wavelength of the laser generator;

a modulator for modulating the optical laser light beam with a radio frequency electromagnetic signal;

a first optical fiber for propagating the first modulated optical laser light beam comprised of a high-dispersion optical fiber for conducting and controlling a time-delay of the first modulated optical laser light beam;

a plurality of optical splitters positioned along the first optical fiber to direct a portion of the first optical laser light beam into a plurality of second optical fibers having zero-dispersion;

a phase conjugator for inverting the optical spectrum of the first modulated optical laser light beam about a predetermined inversion frequency located at one or more predetermined points along the first optical fiber;

a photodetector for converting the first modulated optical laser light beam and each of the plurality of optical light beams in the second optical fibers into an electromagnetic signal; and a plurality of antenna elements, each antenna element associated with at least one photodetector for transmitting the electromagnetic signal.

4. A method for achieving a true time-delay in an array antenna feed system comprising:

generating at least one modulated optical signal having at least one wavelength and predetermined optical spectrum and containing at least one modulated signal;

splitting the modulated optical signal, in the transmit mode, into a plurality of modulated optical signals and combining a plurality of modulated optical signals, in the receive mode, into at least one optical signal;

propagating, respectively, the plurality of modulated optical signals at a velocity dependent on the optical wavelength of each of the modulated optical signal thereby producing a plurality of time delayed modulated optical signals;

inverting the optical spectrum of the modulated optical signal about a predetermined inversion frequency at predetermined locations along at least one of the propagating means;

converting, in a transmit mode, the plurality of time-delayed modulated optical signals into a plurality of electromagnetic signals and, in the receive mode, converting a plurality of electromagnetic signals into a plurality of optical signals; and transmitting and receiving the plurality of electromagnetic signals.

* * * * *